United States Patent
Walgers et al.

[11] Patent Number: 6,061,630
[45] Date of Patent: May 9, 2000

[54] NAVIGATION SYSTEM AND METHOD FOR GUIDING A ROAD VEHICLE

[75] Inventors: Erik J. Walgers; Edwin W. Mulder; Carla J. M. Emmerink; Paul D. M. E. Lahaije, all of Eindhoven, Netherlands

[73] Assignee: U.S. Philips Corporation, New York, N.Y.

[21] Appl. No.: 08/992,287

[22] Filed: Dec. 17, 1997

[30] Foreign Application Priority Data

Dec. 20, 1996 [EP] European Pat. Off. .............. 96203652

[51] Int. Cl.⁷ ................................................. G06F 165/00
[52] U.S. Cl. ........................ 701/210; 701/202; 701/207; 701/209; 701/211; 340/988; 340/990
[58] Field of Search ................................ 701/200, 202, 701/207, 208, 209, 210, 211, 214, 216; 340/988, 990, 995; 73/178 R

[56] References Cited

U.S. PATENT DOCUMENTS

| | | | |
|---|---|---|---|
| 5,272,638 | 12/1993 | Martin et al. | 364/444 |
| 5,359,529 | 10/1994 | Snider | 701/210 |
| 5,406,490 | 4/1995 | Braegas | 364/449 |
| 5,508,931 | 4/1996 | Snider | 701/201 |
| 5,537,323 | 7/1996 | Schulte | 364/449 |
| 5,774,071 | 6/1998 | Konishi et al. | 701/211 |

FOREIGN PATENT DOCUMENTS

| | | | |
|---|---|---|---|
| 0534533A1 | 3/1993 | European Pat. Off. | G01C 21/20 |
| 0756153A2 | 1/1997 | European Pat. Off. | G01C 21/20 |

*Primary Examiner*—William A. Cuchlinski, Jr.
*Assistant Examiner*—Gertrude Arthur
*Attorney, Agent, or Firm*—Bernard Franzblau

[57] ABSTRACT

In a navigation system a driver of a vehicle is guided along a planned route (310) from an origin to a destination. The system comprises a receiver (122) for receiving a traffic message of an actual travel condition concerning a road-element. The system comprises an evaluation module (126) to determine whether the received traffic message makes it necessary to plan a new route to the destination. If a traffic message is received for a road-element which does not form a part of the planned route (212), the evaluation module determines whether the message indicates an improvement (204) of the travel condition of that road-element and if this is so then the planning module plans a new route.

20 Claims, 2 Drawing Sheets

NAVIGATION SYSTEM AND METHOD FOR GUIDING A ROAD VEHICLE

BACKGROUND OF THE INVENTION

This invention relates to a method for guiding a driver of a road vehicle along a route, the method comprising the steps of:

planning the route between a current position and a destination, the route comprising a number of road-elements, receiving and decoding a traffic message and therefrom deriving the actual travel condition of a particular road-element to which the message is directed, evaluating whether replanning the route is required, which evaluation comprises detecting whether the actual travel condition indicates a problem relating to one of the road-elements on the route to the destination and if this is the case then deciding to replan the route, and in the case of a positive decision, replanning the route between the current position and the destination.

The invention further relates to a navigation system for guiding a driver of a road vehicle along a route, the system comprising:

a planning module for planning the route between a current position and a destination, the route comprising a number of road-elements, a receiver for receiving and decoding a traffic message and therefrom deriving an actual travel condition of a particular road-element to which the message is directed, an evaluation module for evaluating whether replanning the route is required, which evaluation module is arranged to detect whether the actual travel condition indicates a problem relating to one of the road-elements on the route to the destination and if this is the case then to decide to replan the route.

Such a method and system are known from the European Patent EP 0 519 934 B1. The known system has means to plan a first route between a current position of the vehicle and a desired destination and has a receiver for receiving and evaluating traffic information. This first route is stored in a memory in the system and the system guides the driver of the vehicle along this route to the destination. When the system receives traffic information, it is determined to what particular road-element the traffic information is concerned. If the particular road-element is part of the first route in the memory, then a second route is planned between the current position and the destination whereby the second route does not comprise that particular road-element. The second route is also stored in the memory in the system and a comparison is made between the two routes. If the travel time for the second route is shorter than the total travel time for the first route, including the additional delay known from the traffic information, then the second route is used as the new route for guiding the driver to the desired destination.

OBJECTS AND SUMMARY OF THE INVENTION

It is an object of the invention to provide a method of the kind set forth in which the route to be followed to the desired destination is more adequately determined, on the basis of received traffic information. This object is achieved according to the invention in a method that is characterised in that the method includes maintaining a list of travel conditions from received messages directed to road-elements in a relevance region, and in case the particular road-element is off the route the evaluation comprises detecting whether the actual travel condition indicates an improvement and if this is the case then deciding to replan the route.

The method according to the invention not only employs traffic information concerning road-elements on the originally planned route but also employs traffic information concerning road-elements off that route. When the route between the current position and the desired destination is initially planned, actual traffic information may have been received for one or more of the road-elements that indicates some delay or obstruction. Taking into account this actual information when planning the initial route will result in a route that does not include those road-elements if that route with other road-elements requires less travel time. If then during the trip along this route, traffic information is again received concerning one of the originally rejected road-elements, this new information could indicate that the delay for that road-element is reduced. If such a situation occurs, the current route may no longer be the optimal choice and new planning of a route between the current position and the desired destination taking into account the reduced delay is necessary.

An embodiment of the method according to the invention is characterised in that the step of planning the route includes exploring a search area for route alternatives and that the relevance region comprises this search area. Maintaining a list of received travel conditions for road-elements in the search area requires less memory space than maintaining such a list for all available road-elements in the system. It is very likely that an improvement for a road-element outside the search area and far away from the current route will have no influence if replanning would be undertaken. The restriction to only monitor messages for road-elements in the search area does not for practical purposes degrade the quality of the decision whether replanning is required or not.

An embodiment of the method according to the invention is characterised in that the relevance region is a restricted area around the route which is reduced in accordance with the progress of the vehicle along the route, the relevance region comprising the current position of the vehicle, the road-elements of the route and the destination. By reducing the relevance region less memory space is required for maintaining a list of messages directed to road-elements from that region. When the vehicle moves along the route to the destination, fewer road-elements will be of interest for replanning the route. Therefore, the area for which the list of messages is maintained can be reduced without having practical impact on the quality of the decision whether replanning the route is required.

An embodiment of the method according to the invention is characterised in that detecting whether the actual travel condition indicates an improvement comprises detection that the received message is no longer valid or detection that a newly received message indicates an improvement with respect to the said actual travel condition of the particular road-element. The improvement of the travel condition of the road-element can be concluded if the original message is no longer valid. The original message can contain an implicit or explicit indication of the duration of the travel condition and when the time of this duration has lapsed the problem is cleared and the travel condition has returned to normal. Furthermore, the improvement of the travel condition of the road-element can be concluded from comparing the newly received travel condition with the travel condition previously received and stored in the list.

An embodiment of the method according to the invention is characterised in that in case the particular road-element is off the route the evaluation comprises detecting whether the message is the first received for the particular road-element and if this is the case then establishing that the travel condition is not an improvement and that no replanning is required. A message relating to a travel condition for a road-element for which no such earlier message has been received will indicate that the travel condition for that road-element has become worse. If such a message is received for a road-element off the route, there will be no need to replan the route.

An embodiment of the method according to the invention is characterised in that in case the particular road-element is on the route the evaluation comprises detecting whether the actual travel condition indicates an improvement and if this is the case then deciding that replanning the route is not required. By verifying whether the message with a travel condition for a road-element on the route ahead indicates an improvement with respect to an earlier received message for that road-element, an unnecessary replanning can be avoided. If the condition of a road-element on the planned route has improved, this route will only become better compared with alternative routes. An alternative route will not be better since the planned route was already the optimal route when it was planned.

It is a further object of the invention to provide a navigation system of the kind set forth which offers an improved evaluation for replanning a new route to the destination, based on received traffic information. This object is achieved according to the invention in a navigation system that is characterised in that the system is arranged to maintain a list of travel conditions from received messages directed to road-elements in a relevance region, and that the evaluation module is arranged to detect in case the particular road-element is off the route whether the actual travel condition indicates an improvement and if this is the case then to decide to replan the route. The navigation system according to the invention evaluates messages for road-elements off the route and in a certain relevance region, and compares the derived actual travel condition for such a road-element with a previously received travel condition, if any, for that road-element. If the comparison indicates that the travel condition for that road-element has improved, then the navigation system decides that replanning the route between the current position and the destination is required. The advantage is that a better route from the current position to the destination may now be found, because of the improved condition of a road-element that was not included in the originally planned route.

An embodiment of the navigation system according to the invention is characterised in that the system is arranged to employ as the relevance region a restricted area around the route which area is reduced in accordance with the progress of the vehicle along the route, the relevance region comprising the current position of the vehicle, the road-elements of the route and the destination. By limiting the area for which messages of road-elements off the route are evaluated and maintained in the list, less memory space is required for that list. By dynamically reducing the area in accordance with the progress of the vehicle, road-elements that are of no interest because they are well behind the vehicle are excluded from evaluation. A further advantage is that fewer occasions require a replanning of the route because the messages of road-elements that are of no interest are no longer evaluated.

Further advantageous embodiments of the invention are recited in the dependent claims.

The present invention is related to an earlier patent application from the same applicant as the present application, wherein the earlier application is filed at the EPO under number 96202607.6, corresponding to U.S. application 08/826,917 (PHN 15977). The system in this earlier application receives a traffic message and determines whether the message is related to an event ahead on the route to be followed. If the event is related to a dangerous condition, the system gives an alarm when the vehicle is approaching the event.

BRIEF DESCRIPTION OF THE DRAWINGS

The invention and its attendant advantages will be further elucidated with the aid of exemplary embodiments and the accompanying schematic drawings, whereby.

Corresponding features in the various Figures are denoted by the same reference symbols.

DETAILED DESCRIPTION OF THE PREFERRED EMBODIMENT

Figure 1:
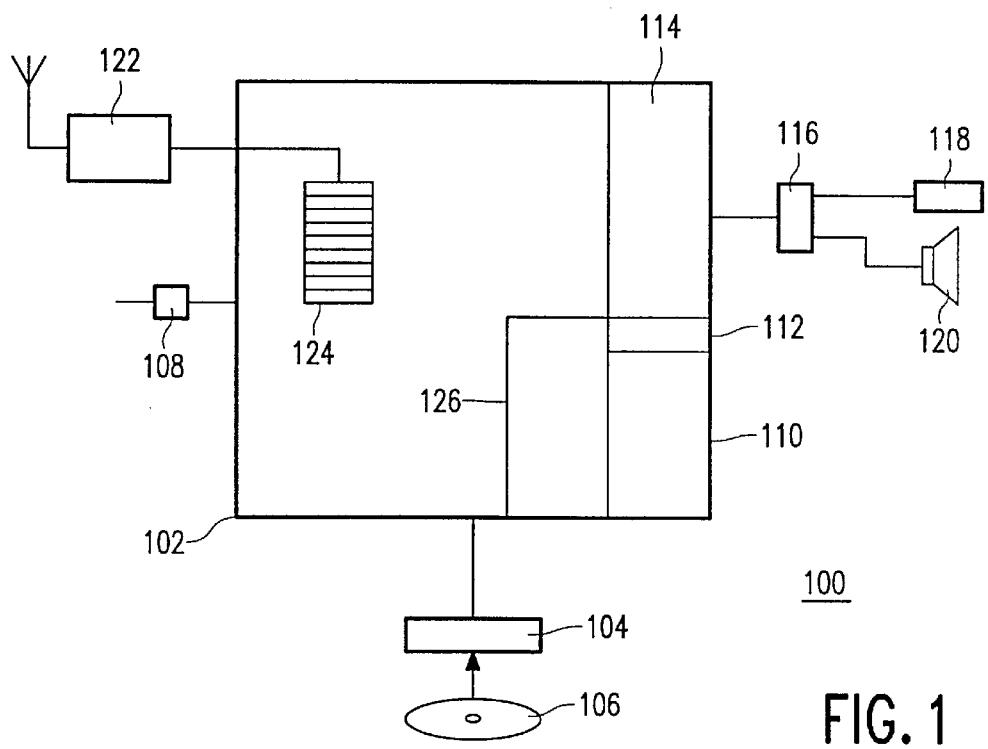
FIG. 1 schematically shows some of the elements of a system according to the invention, FIG. 2 gives an overview of the actual travel conditions in relation to the location of the road-element.

FIG. 1 schematically shows some of the elements of a system according to the invention. The system 100 comprises a central unit 102 which controls the operation of the system and which includes various modules for performing specific tasks. The central unit can be implemented on a computer comprising a central processor and working memory loaded with software programs for carrying out the specific tasks. The system 100 has reading means 104 to read information from a map database stored on a data carrier, like CD-ROM 106. Other types of carrier can also be used, e.g. magnetic disk and IC Card. The map database comprises information on roads in the area to which the particular map relates, e.g. all roads of a country or of a state. In the map database, a road-element is used to identify an elementary part of a road and is used to represent the road in a discrete way, Examples of road-elements are: a part of the road between two junctions, a part of the road with a certain direction, a part of the road with a certain name, and a part of the road at an intersection. The system 100 is equipped with an interface 108 suitable for receiving information concerning the current position of the vehicle in which the system is employed. This information can be supplied by a position determining system like a GPS receiver, using information broadcast by dedicated satellites. However, the position information can also be determined in another way, for instance using a locating system with one or more distance sensors, for measuring the distance travelled by the vehicle, and a compass, for measuring the heading of the vehicle. The system 100 further comprises a planning module 110 that is suitable to plan a route between the current position of the vehicle and a desired destination. The desired destination is entered into the system in a convenient way, e.g. by entering the post code via a keyboard, by entering road names, by entering co-ordinates or by pointing to a position on a map displayed by the system. The planning module 110 searches through the map database for a route that is optimal according to some criterion. The planning module creates a large number of possible routes, each comprising a number of road-elements, between the current position and the desired destination. The criterion can be the travel time, the travel distance, a combination of time and distance, or some other criterion that can be derived from information in the map database. The resulting route, comprising a number of selected road-elements, is stored in memory space 112 and the driver of the vehicle is given guidance to follow this route. To this end, the system comprises a guidance module 114 and an interface 116 for sending the guidance information to display 118 and/or loudspeaker 120. Providing a driver with guidance to follow a predetermined route is known in the art and is for instance described in U.S. Pat. No. 5,537,323 (PHN 13872) and in European patent application EP 534 533 (PHN 13857).

The system 100 further comprises a receiver 122 for receiving and decoding a broadcast message. In an embodiment of the invention, the messages are standardised to include a certain number of events as is further described in the earlier application, filed at the EPO under number 96202607.6, corresponding to U.S. application 08/826,917 (PHN 15977). From such a message an actual travel condition can be derived concerning one or more road-elements of the map database, like a traffic jam, slow traffic with a given speed on a road-element, or an obstruction of a road-element. The standardisation of the messages makes it possible to relate the information in the message with road-elements in the map database of the system. When such a road-element resides in the relevance region, an area of interest in view of replanning the route between the current position and the desired destination, the system stores the message with the actual travel condition in a list 124. When at a later moment another message is received concerning a road-element of which the travel condition is in the list, it can be determined whether the travel condition has improved or has become worse by comparing the new received travel condition with the one in the list. In the embodiment mentioned above, a message identifies a problem location, this is one position from a set of standard positions available to specify a traffic event, and specifies the direction and extent of the traffic event. From that information, the receiver is able to derive which road-elements are indicated by the message and what actual travel condition the message constitutes for these road-elements. Alternatively, this task could be performed by the central unit 102 instead of by the receiver 122. Maintaining the list of messages for relevant road-elements can be realised in various ways. In a first realisation, the 'raw' message is stored, i.e. the information concerning the problem location and extent are stored and the derived information as to what road-elements the message is directed is not stored explicitly. When in this realisation the received travel condition of a road-element is later on required, e.g. for planning the route or for comparing it with new information, the list of messages is accessed and the required information is then derived from it. In a second realisation, the unpacked message is stored, i.e. the derived information as to the travel condition of the road-elements to which the message is directed, is stored in addition to or alternative to the raw message itself. When in this realisation the travel condition of a road-element is required, this can be directly retrieved from the list. The first realisation has the advantage that less information needs to be stored, because one message may be directed to many road-elements. The second realisation has the advantage that the required travel condition of a road element is directly accessible. The actual choice of realisation will depend on the number of messages to be maintained and is a trade-off between memory requirements and processing time. The planning module 110 of the system is able to use the received actual travel condition of the road-elements in addition to the information available in the map database. In this way, the planning module is able to plan an optimal route taking into account the dynamic travel information received via the messages.

While the system guides the driver along the planned route, a message concerning a road-element in the relevance region may be received. This message could indicate a modified travel condition of a road-element which forms part of one of the alternative routes that had been examined by the planner for finding the optimal route. Because of the change in travel condition, the route that has been selected by the planning module may be no longer the optimal route and a replanning of the route between the current position and the desired destination could be necessary. The system 100 comprises an evaluation module 126 that evaluates based on a received message whether or not replanning of the route is required. The task of replanning the route is executed by the planning module 110.

A received message is only of potential relevance to the system if it concerns a travel condition for some road-element. If the message is related to some event that has no influence on the travel condition, e.g. a weather forecast indicating an expected temperature, then such messages can be discarded. A message for the system of the present invention is understood to be a message including information concerning the travel condition of a road-element. This information can be implicitly available in the message and translated by the system into some travel condition for the road-element.

Figure 2:
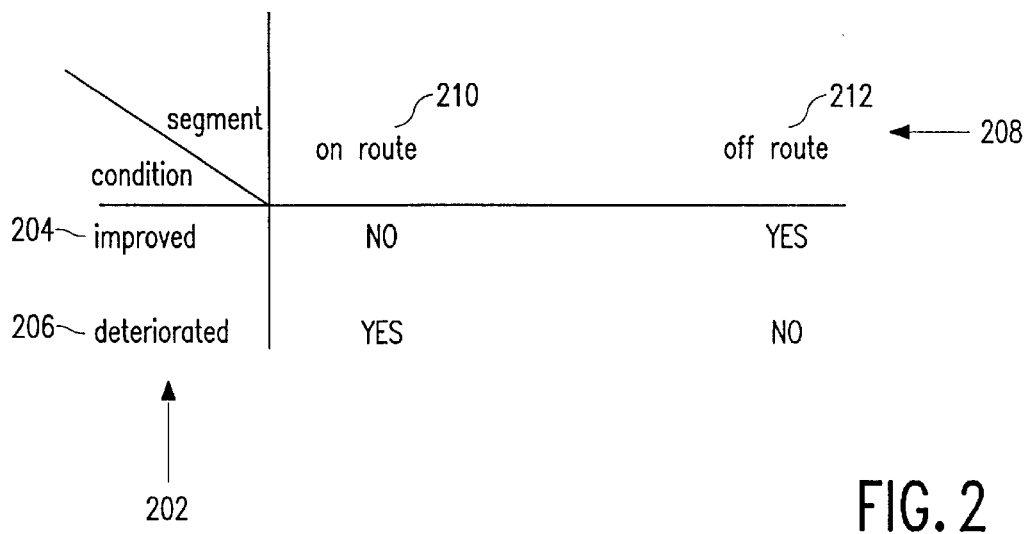

FIG. 2 gives an overview of the actual travel conditions in relation to the location of the road-element. The actual travel condition for a particular road-element can be derived from a received message. In column 202 it is indicated that the actual travel condition may have improved, indicated by 204, or may have deteriorated, indicated by 206, compared with possible earlier received information. The particular road-element for which the actual travel condition is derived is located inside the relevance region. As indicated in line 208, the particular road-element can be located on the route to the destination, indicated by 210, or can be located off the route, as indicated by 212. Based on these possibilities for the changes in the travel conditions and for the locations of the particular road-element, the evaluation module determines whether or not replanning is required according to the following rules.

1. If the travel condition has improved and the particular road-element is on the planned route to the destination, replanning is not necessary. The planned route comprises a road-element for which the travel condition has improved and therefore this route has become better compared with the alternatives.

2. If the travel condition has improved and the particular road-element is off the route, replanning is necessary. The particular road-element is on one of the alternative routes and since this route has now become better, the originally planned route might no longer be the optimal route.

3. If the travel condition has deteriorated and the particular road-element is on the planned route to the destination, replanning is necessary. The planned route might no longer be the optimal route because of the deteriorated road-element included in the route.

4. If the travel condition has deteriorated and the particular road-element is off the planned route, replanning is not necessary. The alternative routes that include the particular road-element have become worse and the other alternative routes have remained unchanged. Therefore the originally planned route remains the optimal route.

The system maintains in a list, either directly or indirectly stored, the received travel conditions for road-elements in the relevance region. When a new message is received for a road-element, then the new travel condition can be compared with the available travel condition and it can easily be established whether the new condition is an improvement or not. When it is according to rule 3 determined whether the particular road-element resides on the route, it suffices to determine whether the particular road-element resides on that part of the route that has not yet been travelled. A deteriorated road-element that has already been travelled will obviously have no effect on the remainder of the trip along the planned route.

The fact that the travel condition of the particular road-element has improved can be derived from different events. A new message may be received concerning the same road-element and explicitly indicating an improved situation, e.g. the earlier message concerns slow traffic with a specified speed and the new message concerns slow traffic with a specified higher speed. Furthermore a message may after a certain period of time become invalid, thereby indicating that the actual travel condition has returned to the normal, undisturbed state. A message may become invalid because the message contained an explicit duration for which the information was valid or the message may become invalid because it was not maintained during a standardised period of time.

The fact that the travel condition for the particular road-element has deteriorated can optionally be derived in a quick and simple way. If a message with a travel condition is received for a particular road-element for which no earlier message had been received, it can be concluded that this indicates a deteriorated travel condition for that particular road-element. Such initial message for a road-element indicates a change of the travel condition from the normal situation and this change is then assumed to be a worse condition.

Figure 3:
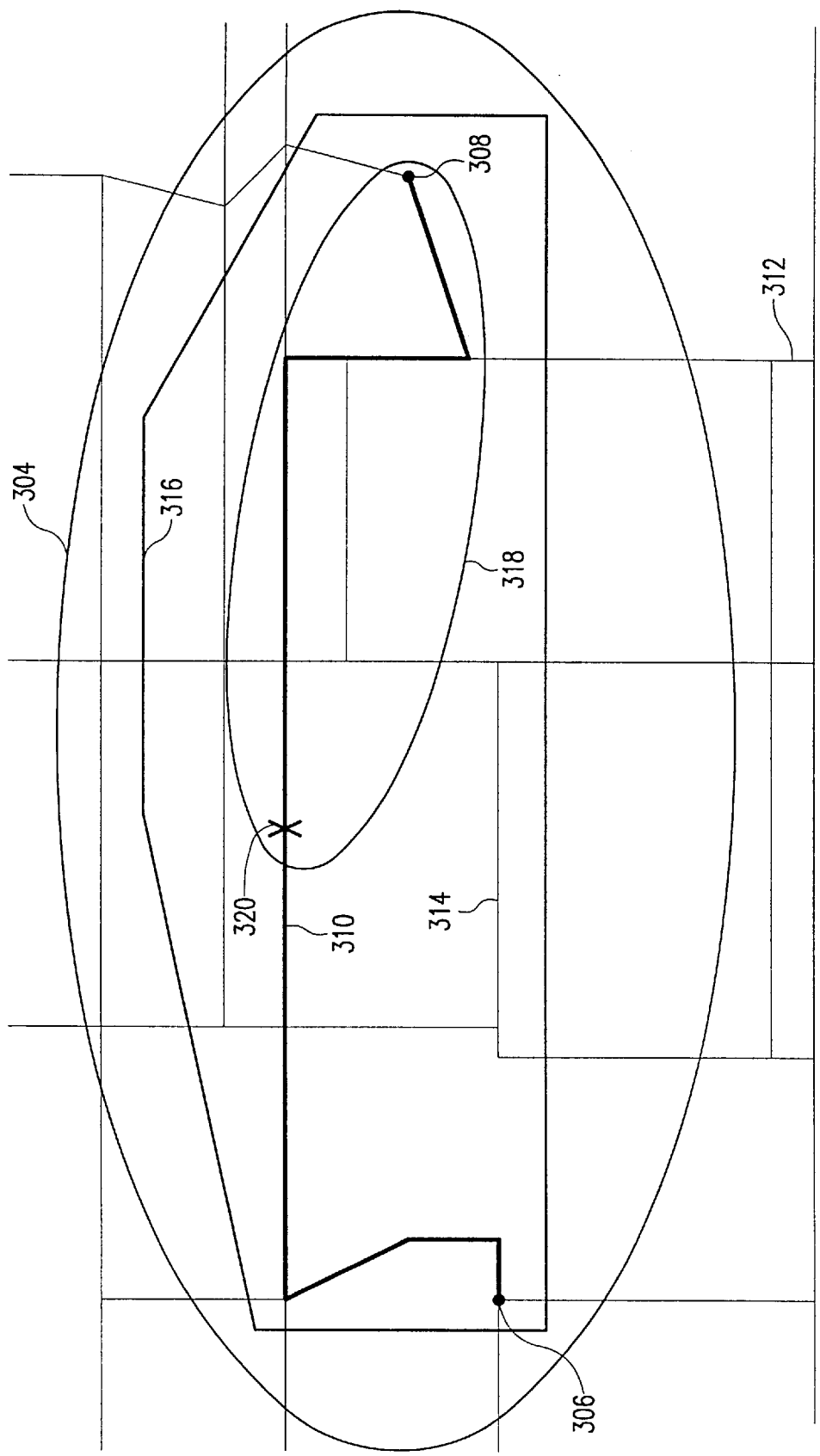
FIG. 3 shows examples of the relevance region with road-elements for which messages are evaluated.

FIG. 3 shows examples of the relevance region with road-elements for which messages are evaluated. The planning module may use a search area 304 from which road-elements are taken in order to construct alternative routes between the current position 306 and the desired destination 308. Using the search area reduces the number of possible routes to be evaluated compared with using all road-elements available from the map database. This reduces the time and resources needed by the planning module to plan a route between the current position to the destination. The actual choice of the search area is a trade-off between the available time and resources of the system on one hand and the risk of missing a more optimal route outside the search area on the other hand. When a route 310 has been determined, the driver of the vehicle is guided along this route. In an embodiment of the invention the search area is used as the relevance region for evaluating a message. When a message is received the location of the particular road-element or road-elements to which the message relates is determined. If the particular road-element is outside area 304, e.g. road-element 312, then the message is not further processed. If the particular road-element is inside area 304, like road-element 314, then the message is further processed as described above in conjunction with FIG. 2. As an alternative, a smaller area than the search area may be used as the relevance region, e.g. area 316. Then messages for fewer road-elements will be evaluated, with the advantage that for fewer road-elements the travel condition has to be maintained in a list. Furthermore, the relevance region may be dynamically reduced when the vehicle progresses along the route 310 to the destination. Road-elements that are well behind the current position of the vehicle will probably not constitute a good route if a replanning is undertaken. Reducing the relevance region may be realised by occasionally creating a new region, e.g. every time the vehicle has travelled a substantial distance along route 310. This new region will then include the current position, the current route and additional road-elements, and the destination. This region is created using similar considerations as for creating a search area for route planning. An example of a dynamically adjusted relevance region is area 318, whereby cross 320 indicates the current position of the vehicle after some progress along the route. After such a reduced area has been created, the currently maintained list needs to be verified for road-elements no longer residing in the relevance region. The list to be maintained thereafter will be shorter.

The shape and size of the search area are based on heuristic rules, whereby the area comprises sufficient road-elements to allow the optimal route to be found and not too many road-elements to reduce the number of alternative routes to be evaluated. In practical situations the search area may have the shape of an ellipse with the current position and the desired destination in the focal points. The relevance region is related to replanning the route and may therefore have a similar shape and/or size as the search area. Alternatively, the relevance region may be smaller than the search area and/or may have a different shape. A simple relevance region is an area bounded by a polygon and including the current position of the vehicle, the road-elements of the current route and the destination. Furthermore, this region includes additional road-elements off the route but in the vicinity of the route in order to allow replanning when the travel conditions of such an additional road-element improves.

What is claimed is:

1. A method for guiding a driver of a road vehicle along a route, the method comprising the steps of:

planning the route between a current position and a destination, the route comprising a number of road-elements, during travel of the vehicle along a planned route, receiving and decoding a traffic message and therefrom deriving an actual travel condition of a particular road-element to which the message is directed, evaluating whether replanning the route is required, which evaluation comprises detecting whether the actual travel condition indicates a problem relating to one of the road-elements on the route to the destination and if this is the case then deciding to replan the route, in case of a positive decision, replanning the route between the current travel position and the destination, maintaining a list of travel conditions from received traffic messages directed to road-elements in a relevance region, and in the case where the traffic message relates to a particular road-element which is off the planned route, the evaluation comprises detecting whether the actual travel condition message indicates an improvement in the particular off-route road element, and if this is the case then deciding to replan the route.

2. A method according to claim 1, wherein the step of planning the route includes exploring a search area for route alternatives and that the relevance region comprises said search area.

3. A method according to claim 1, wherein the relevance region is a restricted area around the route, and reducing the relevance region in accordance with the progress of the vehicle along the route, the relevance region comprising the current position of the vehicle, the road-elements of the route and the destination.

4. A method according to claim 1 wherein detecting whether the actual travel condition indicates an improvement comprises detecting that the received message is no longer valid or detecting that a newly received message indicates an improvement with respect to said actual travel condition of the particular road-element.

5. A method according to claim 1, wherein the particular road-element is off the route, the evaluation comprises detecting whether the message is the first received for the particular road-element and if so then establishing that the travel condition is not an improvement and that no replanning is required.

6. A method according to claim 1, wherein the particular road-element is on the route, the evaluation comprises detecting whether the actual travel condition indicates an improvement and if so then deciding that replanning the route is not required.

7. A method according to claim 3 wherein the relevance region includes additional road-elements off the route but in the vicinity of the route.

8. A navigation system for guiding a driver of a road vehicle along a route, the system comprising:
   a planning module for planning the route between a current position and a destination, the route comprising a number of road-elements,
   a receiver for receiving and decoding a traffic message and therefrom deriving an actual travel condition of a particular road-element to which the message is directed,
   an evaluation module for evaluating whether replanning the route is required, wherein the evaluation module is arranged to detect whether the actual travel condition indicates a problem relating to one of the road-elements on the route to the destination and if this is the case then to decide to replan the route, wherein
   the system is arranged to maintain a list of travel conditions from received traffic messages directed to road-elements in a relevance region, and
   the evaluation module is arranged to detect, in the case where the particular road-element is off the route, whether the actual travel condition indicates an improvement and if so then to decide to replan the route.

9. A navigation system according to claim 8, wherein the planning module is arranged to explore a search area for route alternatives and that the relevance region comprises said search area.

10. A navigation system according to claim 8, wherein the system is arranged to employ as the relevance region a restricted area around the route, which area is reduced in accordance with progress of the vehicle along the route, the relevance region comprising the current position of the vehicle, the road-elements of the route and the destination.

11. A navigation system according to claim 10 wherein the relevance region includes additional road-elements off the route but in the vicinity of the route.

12. A navigation system according to claim 10 wherein the planning module explores a search area for alternative routes and the relevance region is smaller than the search area.

13. A navigation system according to claim 10 wherein the evaluation module detects, when the particular road-element is off the route, whether the message is the first received for the particular road-element and if so establishing that the actual travel condition is not an improvement and that no replanning is required.

14. A navigation system according to claim 8, wherein the evaluation module is arranged to detect whether the actual travel condition indicates an improvement on the basis of detection that the received message is no longer valid or of detection that a newly received message indicates an improvement with respect to said actual travel condition of the particular road-element.

15. A navigation system according to claim 8, wherein the evaluation module is arranged to detect, in case the particular road-element is off the route, whether the message is the first received for the particular road-element and if so then to establish that the actual travel condition is not an improvement and that no replanning is required.

16. A navigation system according to claim 8, wherein the evaluation module is arranged to detect, in case the particular road-element is on the route, whether the actual travel condition indicates an improvement and if so then to decide that replanning the route is not required.

17. A navigation system according to claim 8 wherein, during travel along a planned route, if a received traffic message relates to a particular off the route road-element within the relevance region, and the evaluation module determines that an improvement occurred in the particular off the route road-element, then the planning module replans for an optimal route from the current vehicle position to the destination.

18. A method for guiding a road vehicle along a route to a destination point, which comprises:
   planning the route between a current vehicle position and the destination point, the route comprising a number of road-elements,
   during travel of the vehicle along a planned route, receiving and decoding a traffic message and deriving therefrom an actual travel condition of a particular road-element to which the message is directed,
   evaluating whether replanning the route is required on the basis of a received traffic message relating to a road-element on the route to the destination point,
   if the traffic message indicates a deterioration of the road-element on the route to the destination point, then replanning the route between the current vehicle travel position and the destination point,
   maintaining a list of travel conditions from received traffic messages directed to road-elements in a relevance region, and
   during travel along a planned route, if a received traffic message relates to a particular off the route road-element within the relevance region, evaluating whether or not an improvement occurred in the particular off the route road-element, and if so,
   then replanning for an optimal route from the current vehicle position to the destination point.

19. A method according to claim 18 which further comprises:
   reducing the relevance region in accordance with the progress of the vehicle along the route, the relevance region comprising the current position of the vehicle, the road-elements of the route and the destination point.

20. A method according to claim 19 wherein the relevance region further comprises additional road-elements off the planned route but in the vicinity thereof.

* * * * *